(12) United States Patent
Cassarly et al.

(10) Patent No.: US 6,219,480 B1
(45) Date of Patent: Apr. 17, 2001

(54) OPTICAL COUPLER FOR COUPLING LIGHT BETWEEN ONE AND A PLURALITY OF LIGHT PORTS

(75) Inventors: William J. Cassarly; John M. Davenport, both of Lyndhurst; Richard L. Hansler, Pepper Pike; Matthew F. Clapper, Hinckley, all of OH (US)

(73) Assignee: Fiberstars Incorporated, Solon, OH (US)

( * ) Notice: Subject to any disclaimer, the term of this patent is extended or adjusted under 35 U.S.C. 154(b) by 0 days.

(21) Appl. No.: 09/240,388

(22) Filed: Jan. 29, 1999

(51) Int. Cl.$^7$ .................................................. G02B 6/26
(52) U.S. Cl. .................................. 385/46; 385/31; 385/39
(58) Field of Search ................................ 385/34, 39, 46, 385/31

(56) References Cited

U.S. PATENT DOCUMENTS

| | | | |
|---|---|---|---|
| Re. 35,138 | 1/1996 | Weidman et al. | 385/42 |
| 3,933,455 | 1/1976 | Chown | 385/45 |
| 4,083,625 | 4/1978 | Hudson | 385/45 |
| 4,089,583 | 5/1978 | Auracher et al. | 385/45 |
| 4,354,731 | 10/1982 | Mouissie | 385/53 |
| 4,360,248 | * 11/1982 | Bickel et al. | 385/50 |
| 4,773,924 | 9/1988 | Berkey | 65/3.11 |
| 4,824,204 | 4/1989 | Pafford | 385/53 |
| 5,058,978 | 10/1991 | Kondoh et al. | 385/43 |
| 5,077,814 | 12/1991 | Shigematsu et al. | 385/24 |
| 5,268,979 | 12/1993 | Weidman | 385/42 |
| 5,355,426 | 10/1994 | Daniel et al. | 385/39 |
| 5,367,590 | 11/1994 | Davenport et al. | 385/39 |
| 5,377,287 | 12/1994 | Lee et al. | 385/35 |
| 5,408,556 | 4/1995 | Wong | 385/48 |
| 5,448,667 | 9/1995 | Arii et al. | 385/49 |
| 5,469,337 | 11/1995 | Cassarly et al. | 362/32 |
| 5,485,538 | 1/1996 | Bowen et al. | 385/92 |
| 5,487,124 | 1/1996 | Bowen et al. | 385/93 |
| 5,729,643 | 3/1998 | Hmelar et al. | 385/43 |
| 5,732,181 | 3/1998 | Engberg et al. | 385/139 |
| 5,745,618 | 4/1998 | Li | 385/46 |
| 5,751,869 | 5/1998 | Li et al. | 385/33 |
| 5,757,995 | 5/1998 | Chen et al. | 385/45 |
| 5,790,729 | 8/1998 | Pologe et al. | 385/46 |
| 5,812,714 | 9/1998 | Hulse | 385/39 |
| 5,838,853 | * 11/1998 | Jinnai et al. | 385/50 |
| 5,841,919 | * 11/1998 | Akiba et al. | 385/37 |

* cited by examiner

Primary Examiner—Rodney Bovernick
Assistant Examiner—Ellen Kim
(74) Attorney, Agent, or Firm—Charles E. Bruzga

(57) ABSTRACT

An optical coupler for coupling light along an axis between a light port on one side of the coupler and a plurality of light ports on another side of the coupler. The coupler comprises a one-side stage with a light port and a many-side stage with a plurality of arms situated about the axis, each having a light port. A midput region separates the one-side and many-side stages and is situated along the axis where the plurality of arms at least initially starts to split from each other in a direction towards the many-side light ports along the axis. Cross sections of each of the respective initial portions of the arms along the direction are arranged about the same distance from the axis. The cross sectional areas of the arms along the axis are larger at a break point region at which the arms fully separate from each other along the axis than at the many-side light ports. At least a pair of the arms each start to split along the direction in a substantially symmetrical manner about the axis.

27 Claims, 11 Drawing Sheets

OPTICAL COUPLER FOR COUPLING LIGHT BETWEEN ONE AND A PLURALITY OF LIGHT PORTS

FIELD OF THE INVENTION

The present invention relates to optical couplers for coupling light between one and a plurality of light ports, and more particularly to such couplers in which the etendue, or brightness, of the light is preserved to a high extent.

BACKGROUND OF THE INVENTION

A common problem in designing fiber-optic lighting systems is to minimize the size (i.e., diameter) and number of light guides required to deliver sufficient light. The smaller the fibers required, the lower the cost and the easier to install. Smaller fibers are more flexible and more easily concealed. If multiple outputs are required, the least expensive and neatest method is to run one large fiber from a light source to an intermediate position and then split the light into a number of smaller fibers. If the large fiber is transporting light at angles up to its acceptance angle, then the coupler should make the split without substantially increasing the angular distribution of light, to reduce light loss. This is possible in principle, if the total areas at input and output are the same, which is often not practical due to design issues, owing to the law of conservation of etendue (or brightness or sparkle of light). The law only states that it is possible, but does not require it.

A primary goal in designing a coupler is to avoid light loss in the coupler. In an ideal case, the aggregate area of the outputs can be the same as the area of the input where the numerical apertures of the input and outputs are the same. Since this is not always practical due to fabrication issues, it is often necessary to allow the aggregate area of the outputs to increase to approximately a factor of two over the input area.

A further goal is to avoid light loss in coupling light to, for instance, output light guides. For this it is necessary that the angular distribution of light at the output not exceed the acceptance angle of the output light guides. Where the numerical aperture of the input and output fibers are the same, this is accomplished by not substantially increasing the angular distribution of light during splitting.

A yet further goal of some embodiments is to split the light between the output ports in a controlled manner. The most typical example is splitting the light evenly between the different ports. It is most often desired, if not a requirement of a fiber system, that the fraction of light and the color of the light be the same for all the ports so that post installation testing can be minimized.

Another goal is to provide output ports which are spatially separate from each other. In the case of typical large core plastic optical fibers, this eliminates the need to strip the cladding and jacket off of the fiber. In the case where the coupler is used as a combiner, this allows space for mechanical packaging of the input sources.

A yet further goal is to minimize the area of the output, since smaller-sized fibers are more economical, etc. It is also desirable to preserve the etendue of the coupled light to a high degree. Preserving the etendue is especially important since it enables the size of the optics that are attached to the fibers, such as automotive headlamps, to be minimized.

SUMMARY OF THE INVENTION

A preferred embodiment of the invention provides an optical coupler for coupling light along an axis between a light port on one side of the coupler and a plurality of light ports on another side of the coupler. The coupler comprises a one-side stage with a light port and a many-side stage with a plurality of arms situated about the axis, each having a light port. A midput region separates the one-side and many-side stages and is situated along the axis where the plurality of arms at least initially starts to split from each other in a direction towards the many-side light ports along the axis. Cross sections of each of the respective initial portions of the arms along the direction are arranged about the same distance from the axis. The cross sectional areas of the arms along the axis are larger (and preferably substantially larger) at a break point region at which the arms fully separate from each other along the axis than at the many-side light ports. At least a pair of the arms each start to split along the direction in a substantially symmetrical manner about the axis.

The coupler according to the foregoing embodiment beneficially has low light loss, while minimizing the area of the output. It beneficially can be made compact in length and diameter, and may have at least a pair of output arms substantially parallel to each other to facilitate coupling to output light guides. Alternatively, the coupler can be designed to combine light from a plurality of light sources.

DETAILED DESCRIPTION OF THE INVENTION

Figure 1:
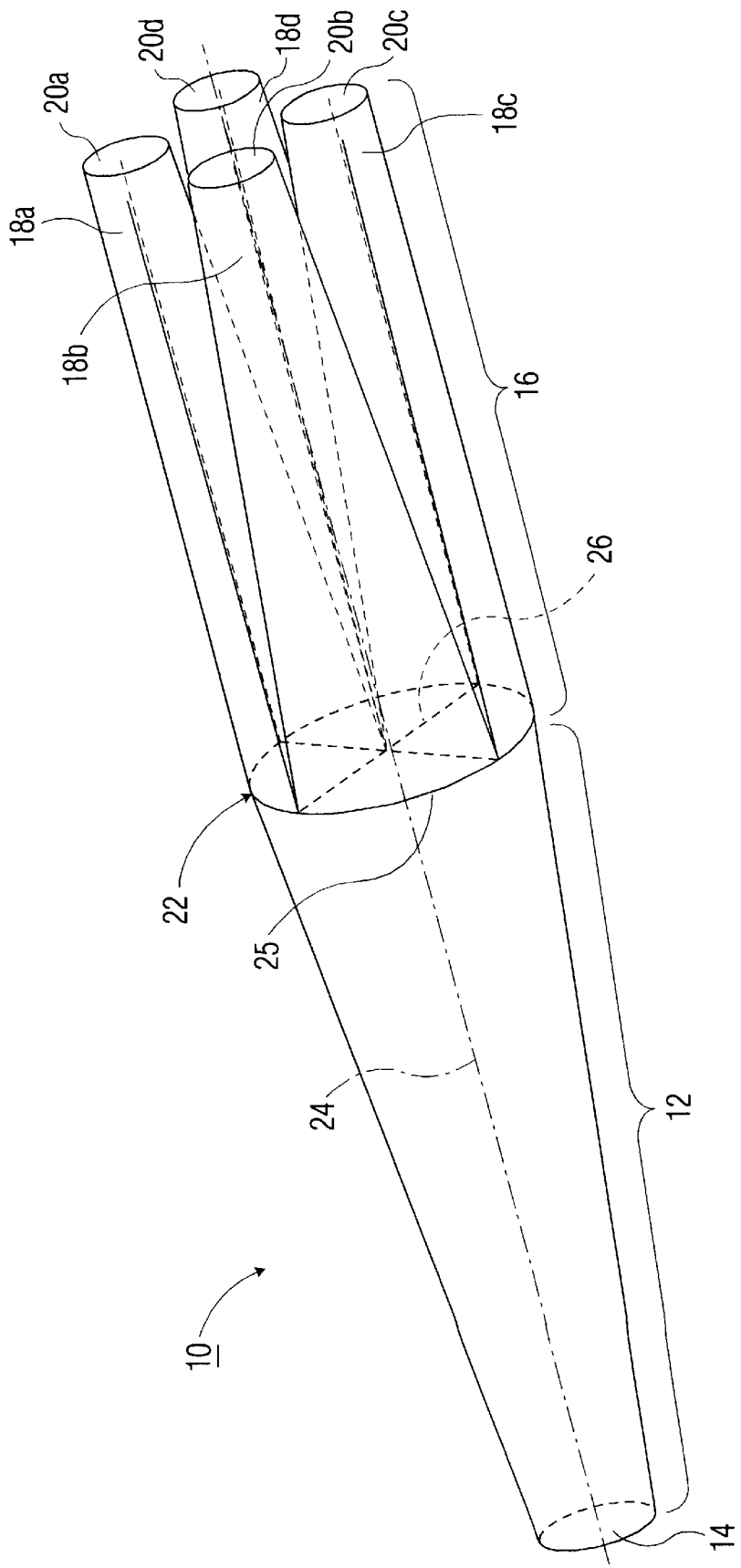
FIG. 1 is a perspective view of a coupler according to one embodiment of the invention.

FIG. 1 shows an optical coupler 10 in accordance with one embodiment of the invention. Coupler 10 includes an input stage 12 having an input port 14, and an output stage 16 having four output arms 18a, 18b, 18c and 18d, each with a respective output port 20a, 20b, 20c or 20d. (In an alternative embodiment, the input and output ports are interchanged, so that light entering ports 20a–20d becomes combined and directed out of the coupler through port 14.)

A midpt region 22 is defined along a central axis 24 of the coupler, where the output arms at least first start to separate from each other along the input-to-output direction of light propagation. Midpt region 22 coincides with a break point region 25, at which output arms 18a–18d fully separate from each other. The arms separate from each other in an "X" shape 26, with the "X" being located in a plane. Midput region 22 is shown with zero length along axis 24, although it could be of non-zero length, e.g., a cylinder.

In a preferred construction of coupler 10, the diameters of input port 14 and output ports 20a–20b are 7 mm and 5 mm, respectively; the axial distance from input port 14 to midput region 22 is 50 mm, and the axial distance from the midput region to the output ports is 40 mm.

Figure 2:
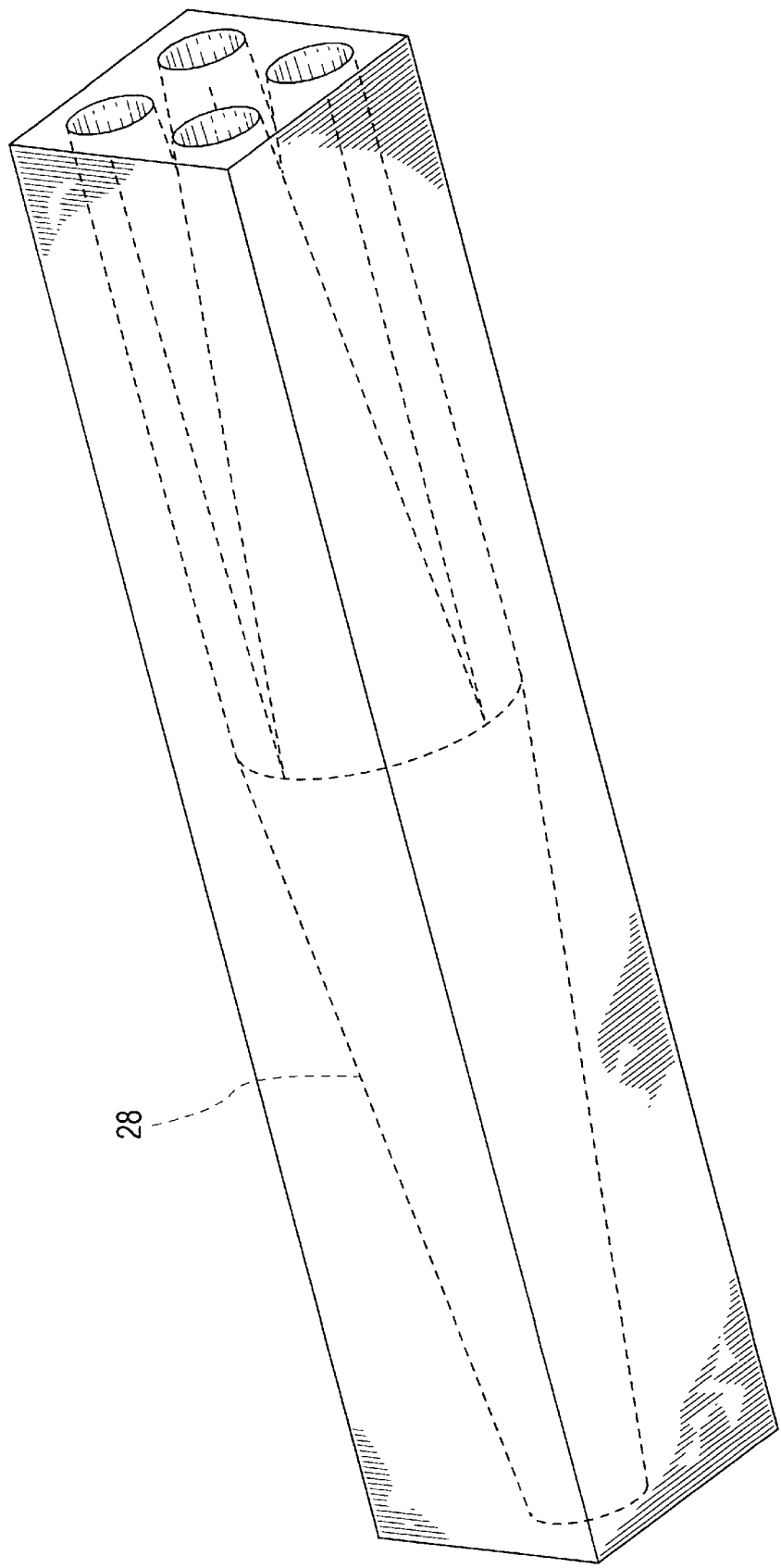
FIG. 2 is a perspective view of a coupler that is alternative to that of FIG. 1.

Coupler 10 is preferably formed as a unitary piece of acrylic, for example, relying on total internal reflection as the primary means of light propagation. Alternatively, coupler 10 (and the other couplers described herein) could comprise a hollow coupler with reflective walls, such as coupler 28 in FIG. 2. Another option is to form the device using a material with a non-uniform index of refraction, often called a Gradient Index material.

Although optical coupler 10 is shown with four output arms, it could alternatively have other numbers of output arms, such as two, three, five or six. Moreover, the cross sections of either the input port or the output ports could be polygonal (e.g., rectangular), rather than circular as shown. The shape of coupler 10 will be more fully described below.

Figure 3:
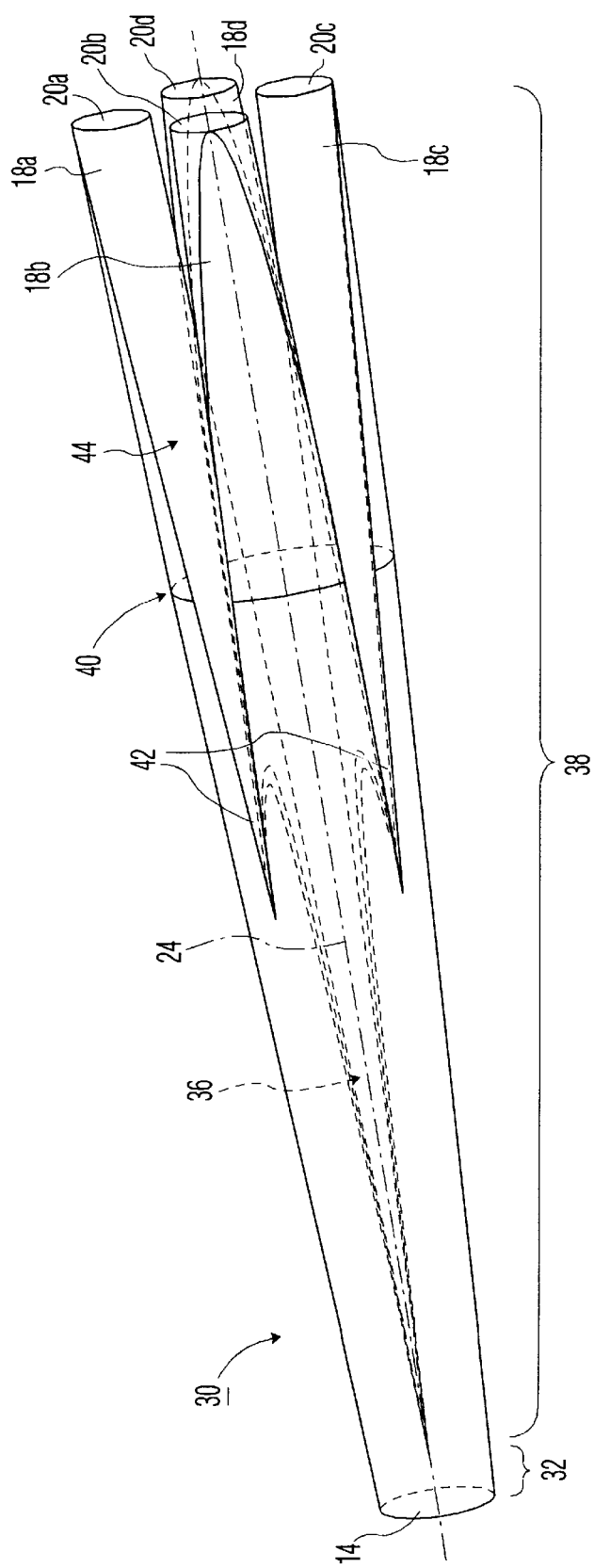
FIG. 3 is a perspective view of another coupler according to the invention.

FIG. 3 shows a preferred coupler 30 in accordance with the invention. The configuration of coupler 30 is selected to more closely preserve the etendue of light transmission than coupler 10 (FIG. 1). Like reference numerals as between different embodiments refer to like parts. As with coupler 10 (FIG. 1), coupler 30 includes an input port 14 and output arms 18a, 18b, 18c and 18d with respective output ports 20a–20d. Its input stage 32 extends along axis 24 from input port 14 to midpt region 34 at which the output arms first start to separate from each other along the input-to-output direction of light propagation. Input stage 32 may be shorter than as shown. This separation is imparted by a void 36 centered about axis 24 and which starts at midpt region 34 and continues for the length of output stage 38 of the coupler. Input stage 32 may be essentially of zero length where void 36 starts at input port 14.

Coupler 30 also includes a break point region 40 at which the output arms are fully separated from each other along the direction of light propagation. Peripheral voids 42 extend along the outer periphery of output stage 38 in elongated manner along the direction of light propagation. Voids 42 face outwardly with respect to axis 24 and are smoothly integrated with a void 44 separating output arms 18a–18d immediately downstream of break point region 40 (i.e., further along the path of light transmission). By "smooth" is meant that the cross section at any point along the axial length transitions to the next point without any substantial discontinuities.

Figure 4:
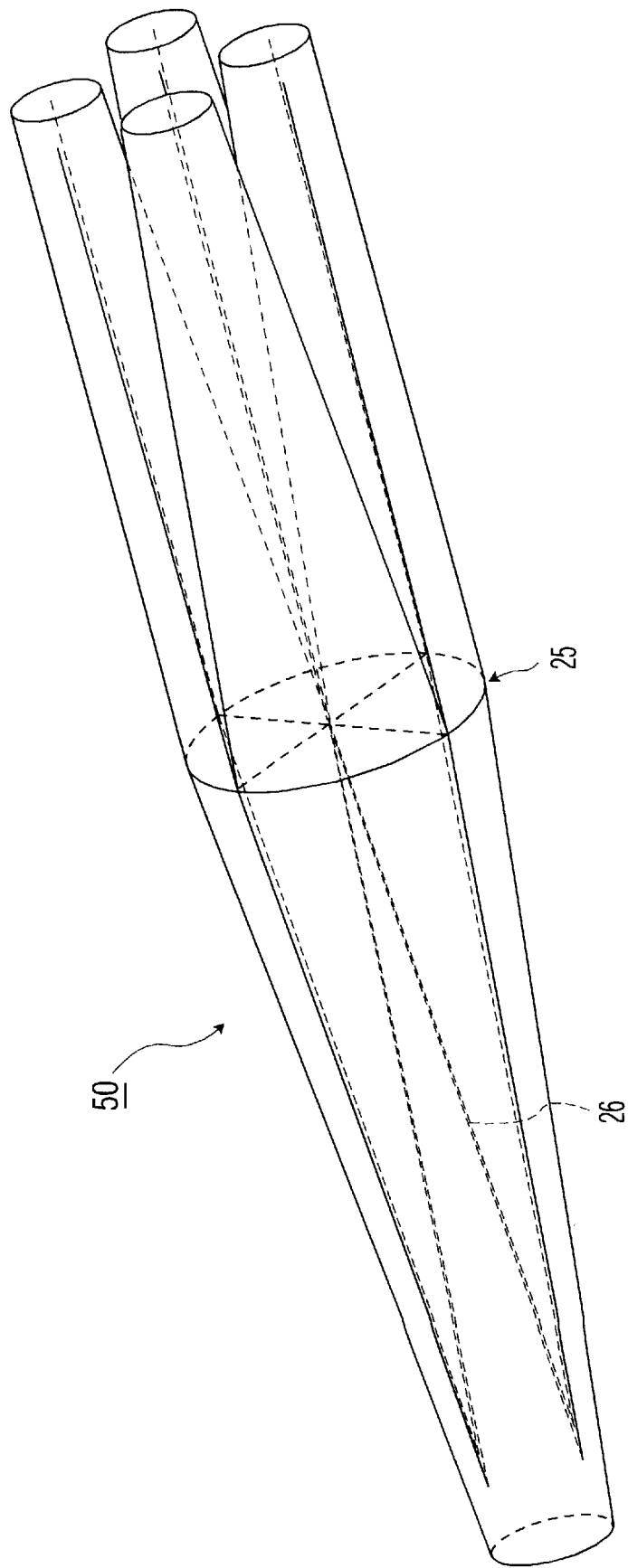
FIG. 4 is a perspective view of a further coupler according to the invention.

FIG. 4 shows a further coupler 50 according to the invention. Coupler 50 is generally similar to coupler 10 (FIG. 1), but its output arms split from each other in an "X" shape 26, as viewed along axis 24, that is non-planar so as to reduce light loss owing to the splitting between the arms. Non-planar "X" shape 26 will be further described below.

Figure 5A:
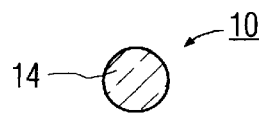
FIGS. 5A–5H show sequential, equally spaced cross sections of coupler 10 of FIG. 1.
Figure 5B:
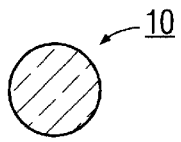
Figure 5C:
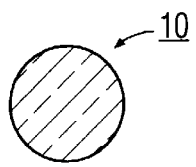
Figure 5D:
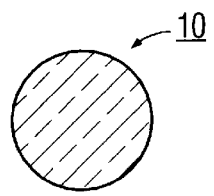
Figure 5E:
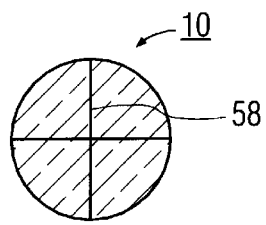
Figure 5F:
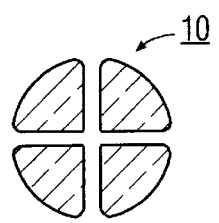
Figure 5G:
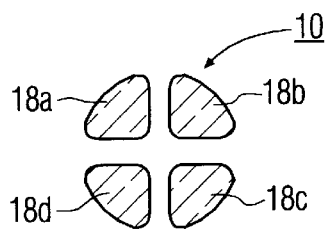
Figure 5H:
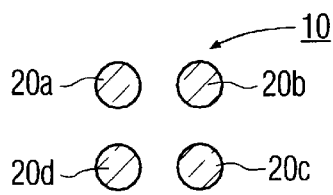

FIGS. 5A–5H show sequential cross sections of coupler 10 of FIG. 1, starting with input port 14 in FIG. 5A, including an "X" shape 58 in FIG. 5E where the output arms separate from each other, and ending with output ports 20a–20d in FIG. 5H.

Figure 6A:
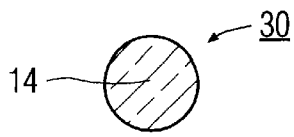
FIGS. 6A–6G show sequential, equally spaced cross sections of coupler 30 of FIG. 3.
Figure 6B:
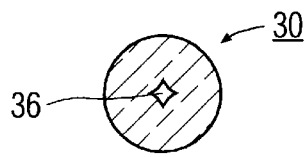
Figure 6C:
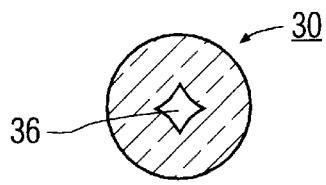
Figure 6D:
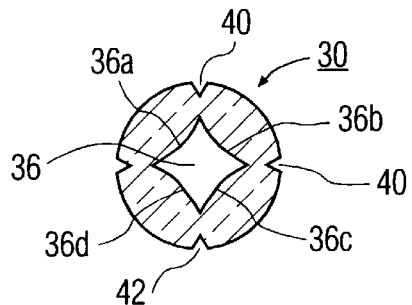
Figure 6E:
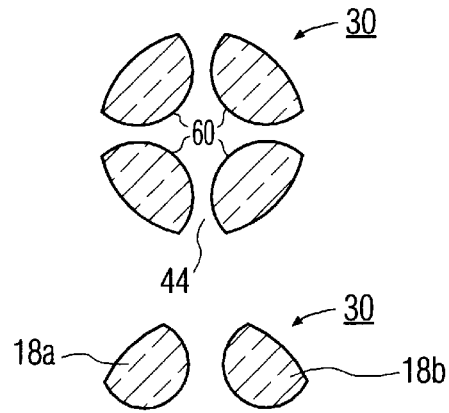
Figure 6F:
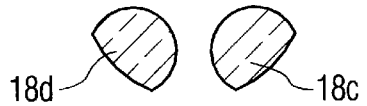
Figure 6G:
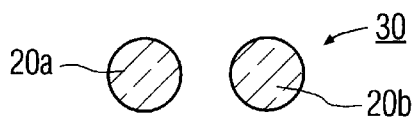
Figure 6G:
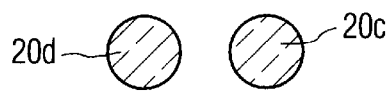

FIGS. 6A–6G show sequential cross sections of coupler 30 of FIG. 3, starting with input port 14 and ending with the output ports in FIG. 6G. FIGS. 6B–6E show cross sections of central void 36, with a periphery defining four arc segments 36a–36d (FIG. 6D) corresponding in shape to the inner peripheries 60 (FIG. 6E) of the of the output arms downstream of the point where the arms are fully separated from each other. Peripheral voids 42 are shown in FIG. 6D. Central and peripheral voids 36 and 42 assist in preserving the etendue of the transmitted light.

Figure 7A:
FIGS. 7A–7H show sequential, equally spaced cross sections of coupler 50 of FIG. 4.
Figure 7B:
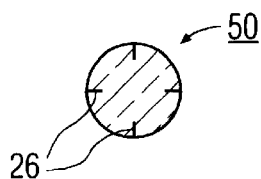
Figure 7C:
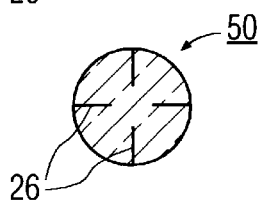
Figure 7D:
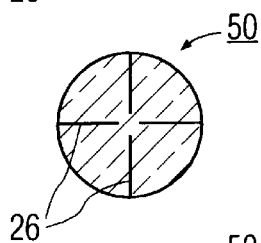
Figure 7E:
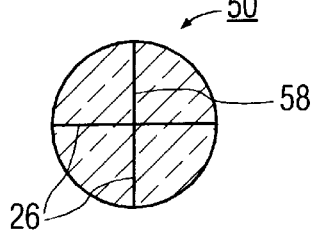
Figure 7F:
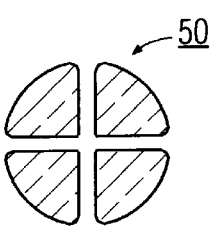
Figure 7G:
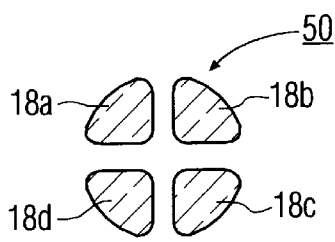
Figure 7H:
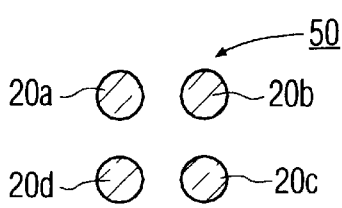

FIGS. 7A–7G show sequential cross sections of coupler 50 of FIG. 4, starting with input port 14 and ending with output ports 20a–20d. Splitting pattern 26, in the form of a non-planar "X", is shown through progressive cross sections, indicating that the center of the "X", in FIG. 7E, is downstream of the peripheral regions of the "X" in FIGS. 7B–7D.

Figure 8:
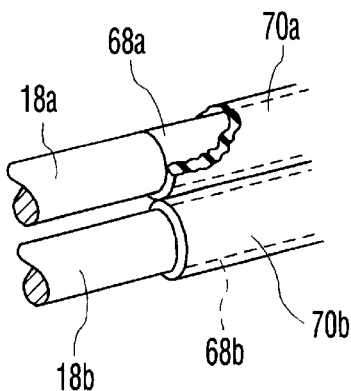
FIG. 8 is a detail view showing portions of output arms of a coupler and corresponding light guides connected to the output arms.

With each of the three couplers 10, 30 and 50 described so far, the outer peripheries of the output arms are substantially parallel to each other. By "substantially parallel" is meant in the specification and claims less than 30% of the half angle of output light. (In other words, the output arms may be tilted, with respect to the main object of the splitter by 30% of the half angle of the output light). Further, the output arms are spatially separated from each other. As such, as shown in FIG. 8, output arms 18a and 18b can be beneficially connected to light guides 68a and 68b without removing cladding and outer jacket 70a and 70b from the light guides. A 4 mm spacing between arms 18a and 18b accommodates typical cladding and outer jacket of adjacent output light guides 68a and 68b. Such spacing is preferably at least about 2 mm, and more preferably at least about 3.2 mm.

DESIGN EXAMPLE

Preferred steps for designing a coupler 70 (FIG. 12A) are illustrated in connection with FIGS. 9A–12C. Coupler 70 has only two output arms, but is otherwise most similar in to coupler 30 of FIG. 3. Establishing rotational symmetry about central axis 24 (FIG. 12A) helps ensure that the light is split equally into each output arm. Such symmetry can also be stated as rotational symmetry about axis 24, or as n-fold symmetry about axis 24, where "n" is the number of output arms. If desired, however, a coupler need not employ rotational or n-fold symmetry, whereby one arm may be larger than an adjacent arm. However, it is usually desired that each arm be spaced about the same distance from axis 24.

Diameters of the input and output ports 14 and 20a–20b (FIG. 12A) and the spacing between output arms 18a and 18b are determined. It is preferred that the area of the input port substantially equals the combined area of the output ports. It is also preferred that the numerical aperture of the input port be substantially the same as that at the output ports. For ease of explanation, specific dimensions are described. Assuming the diameter of the input port is 10 mm, the diameter of each of the two output ports is $10/(2^{1/2})$ mm, or about 7 mm. A center-to-center spacing between output ports of 11 mm provides a 4 mm gap between ports, which accommodates typical cladding and jacket on downstream light guides as described above with respect to FIG. 8.

Figure 9A:
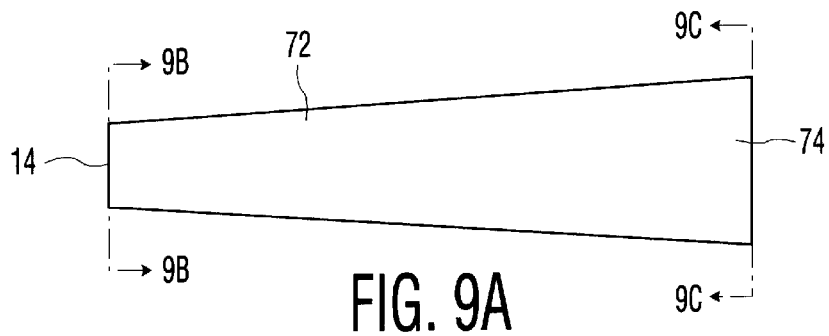
FIG. 9A is a side view of an angle-to-area converter used to produce a preferred embodiment of the inventive coupler in accordance with a design example.

In FIG. 9A, a forward converter 72 is designed to start with the desired input port size and to end with a shape surrounding all of the output ports. The shape of converter 72 is chosen to provide an appropriate angle-to-area conversion. While a straight taper is shown for converter 72, other tapers will be obvious to those of ordinary skill in the art, as now discussed.

As reported in X. Ning, R. Winston, and J. O' Gallagher, Appl. Optics, vol. 26, no. 2 (January 1987), pp. 300–305, a dielectric totally internally reflecting concentrator can transform a port of area A1 with maximum angle $Theta_{13}$ 1 to an area A2 with maximum angle $Theta_{13}$ 2, where $A1*sin(Theta—1)^2$ $A2*sin(Theta—2)^2$ Such an angle-area transformer is also called a Theta—1/Theta—2 converter by the foregoing Ning et al. Reference.

One particular embodiment of a Theta_1/Theta_2 converter is a dielectric compound parabolic concentrator (DCPC) which are described in W. T. Welford and R. Winston, High Collection Nonimaging Optics, New York: Academic Press, Inc. (1989), chapter 4 (pp. 53–76, 82–84). In some cases, a DCPC can be replaced with a tapered cone or two tapered cones attached to one another, except that the DCPC is typically shorter in length. Another method to implement an angle-area-converter is to combine a gradient index (GRIN) rod with a tapered cone, as discussed in A. Cutolo, et. al., Appl. Optics, vol. 29, no. 9 (Mar. 20, 1990), pp. 1353–1363.

Typically, angle-to-area converters have the same shape at the input and output ports. If the shapes are different, the skew invariant, such as discussed in the foregoing Welford et al. reference at pp. 228–230, may limit the performance of a Theta—1/Theta—2 converter. When the input and output areas are different, a slow taper from one shape to the other provides reasonable performance for a Theta—1/ Theta—2 converter, as suggested by Garwin, R. L. in "The design of Liquid Scintillation Cells," Rev. Sci. Instruments, vol. 23 (1952), pp. 755–757. Adjusting the cross-section along the taper may provide improved performance in some cases, especially if the aspect ratio of the output ports is much different than the input port, and the length of the coupler is to be minimized. Some investigations of nonrotationally symmetric, non-imaging optic devices have been performed recently. See "Nonrotationally Symmetric Reflectors for Efficient and Uniform Illumination of Rectangular Apertures", by Shatz, et. al., SPIE vol. 3428, pp. 176–183. An extension of the ideas presented by the foregoing Shatz article is to create an angle-to-area device which transitions from one shape to another where the intermediate cross-sections have star-like cross-sections.

The shorter the forward converter 72, the shorter the overall coupler produced. A longer coupler will ensure more thorough light mixing and make the illuminance distribution more uniform at the break point (not shown). This can make dividing of light a among the output arms more uniform. On the other hand, a shorter coupler is desirable for compactness.

Figure 9B:
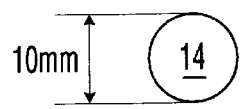
FIG. 9B is an end view of the converter of FIG. 9A taken along line 9B—9B in FIG. 9A.
Figure 9C:
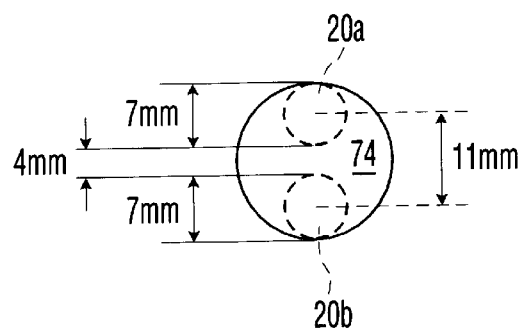
FIG. 9C is an end view of the converter of FIG. 9A taken along line 9C—9C in FIG. 9A.

FIG. 9B shows input port 14 with a diameter of 10 mm. FIG. 9C superimposes output ports 20a and 20b, shown in dashed lines, on face 74 of converter 72 (FIG. 9A). With each output port having a 7 mm diameter and with a 4 mm spacing between ports, as assumed above, the minimum diameter of face 74 is 18 mm.

Figure 10A:
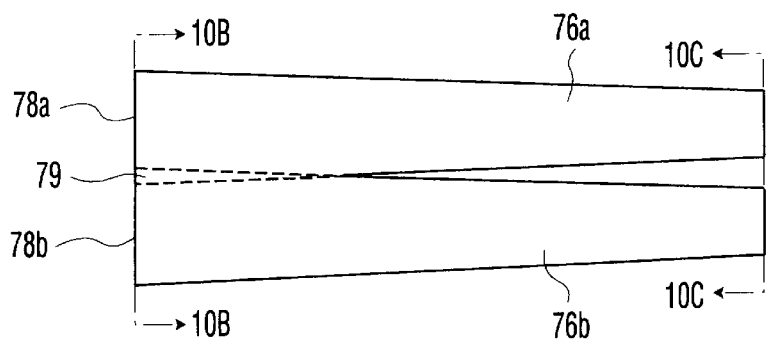
FIG. 10A is a side view of a pair of angle-to-area sub-converters used to produce a preferred embodiment of the inventive coupler in accordance with the mentioned design example.

According to FIG. 10A, two angle-to-area converters 76a and 76b are designed, and are referred to herein as sub-backward converters (or sub-converters). The subbackward converters preferably each overlap the other in the vicinity of numeral 79 so that the axial shape of their left side is the same as the axial shape of their right side. (In contrast, coupler 10 of FIG. 1 and FIGS. 5A–5H was designed with the left-hand ends of the sub-converters being pie- or wedge-shaped, like the 90-degree portion of coupler 10 as shown in FIG. 5E, so that adjacent sub-converters abut each other.) Sub-converters 76a and 76b, as shown, are parallel to each other such that their axial center-to-center spacing (not shown) of 11 mm at the left-shown end is the same as the center-to-center spacing (not shown) at the right-hand end. The two sub-converters need not be parallel to each other, but if they are not parallel, then they may not be axisymmetric, that is, rotationally symmetric about the main axis (e.g., axis 24, FIG. 1).

Figure 10B:
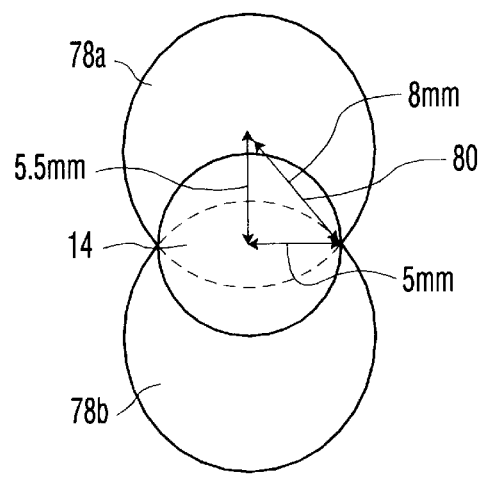
FIG. 10B is an end view of the sub-converters of FIG. 10A taken along line 10B—10B in FIG. 10A.
Figure 10C:
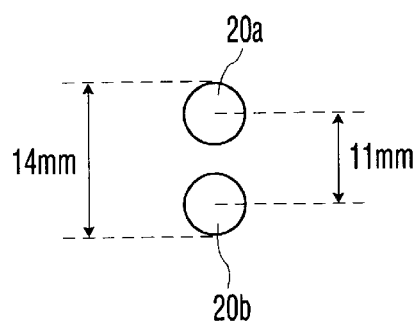
FIG. 10C is an end view of the sub-converters of FIG. 10A taken along line 10C—10C in FIG. 10A.

FIG. 10C shows output ports 20a and 20b dimensioned as noted with respect to FIG. 9C. FIG. 10B shows end faces 78a and 78b of converters 76a and 76b dimensioned so that, when such converters overlap, input port 14 is preferably at least covered to prevent light loss. Thus, the triangle at 80 shows that for input port 14 of 10 mm diameter (5 mm radius), and with a center-to-center spacing between faces 78a and 78b of 11 mm (or half spacing of 5.5 mm), the minimum diameter for faces 78a and 78b is 16 mm each (radius of 8 mm). The 8 mm radius in triangle 80 is approximately the square root of the sum of 5.5 $mm^2$ and 5 $mm^2$.

Figure 10D:
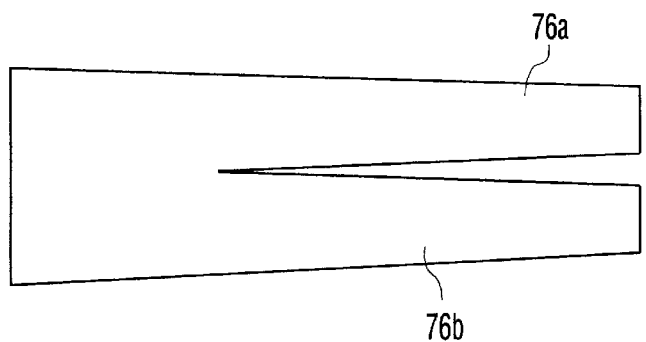
FIG. 10D is a side view of the sub-converters of FIG. 10A after undergoing a union operation.

FIG. 10D shows both converters 76a and 76b unioned together according to the logic of the Boolean "OR" function, which, incidentally, eliminates any overlap (e.g. at 79 in FIG. 10A).

Figure 11A:
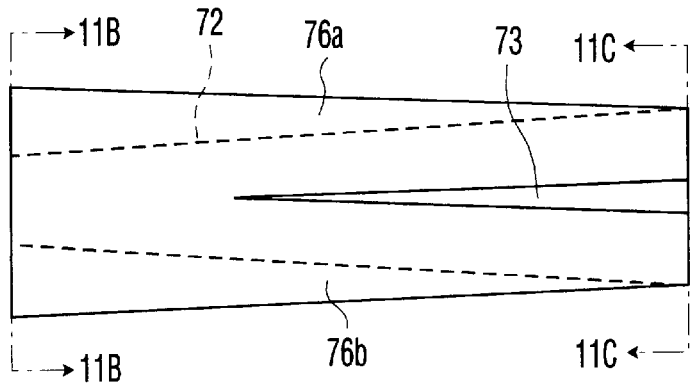
FIG. 11A is a side view of the converter of FIG. 9A and sub-converters of FIG. 10D interpositioned with respect to each other, in accordance with the mentioned design example.
Figure 11B:
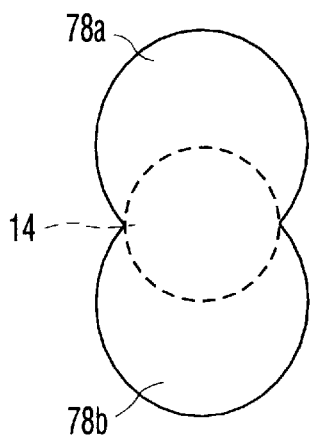
FIG. 11B is an end view of the converters of FIG. 11A taken along line 11B—11B in FIG. 11A.
Figure 11C:
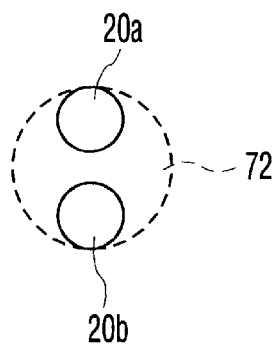
FIG. 11C is an end view of the converters of FIG. 11A taken along line 11C—11C in FIG. 11A.

FIG. 11A shows the unioned sub-backward converters 76a and 76b overlapping forward converter 72, shown in dashed lines for clarity. Only a part of converter 72, at 73, is directly visible. FIG. 11B shows the left-hand side of the overlapped converters of FIG. 11A, with input port 14 shown in dashed lines for clarity. FIG. 11C shows the right-hand side of the overlapped converters, with converter 72 shown in dashed lines for clarity.

Figure 12A:
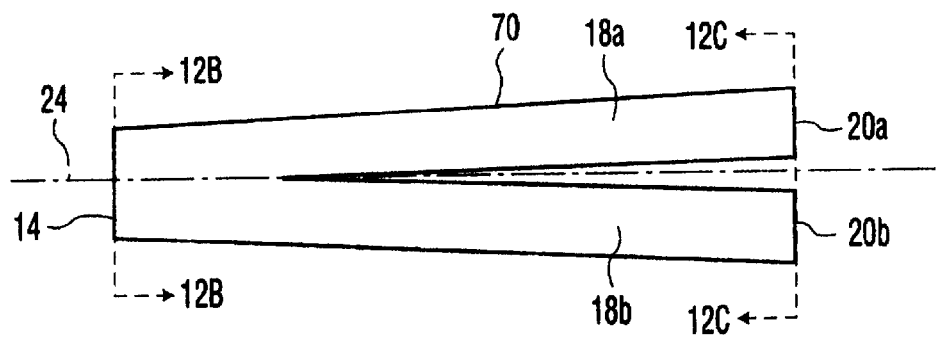
FIG. 12A is a side view of a coupler produced according to the mentioned design example.
Figure 12B:
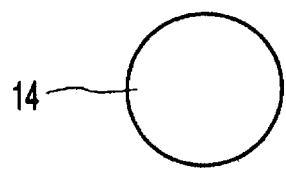
FIG. 12B is an end view of the coupler of FIG. 12A taken along line 12B—12B in FIG. 12A.
Figure 12C:
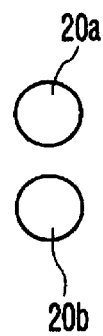
FIG. 12C is an end view of the coupler of FIG. 12A taken along line 12C—12C in FIG. 12A.

As shown in FIG. 12A, the overlapped converters are then intersected according to the Boolean "AND" function, so that only the portions of each which overlap each other remain in the intersected product, shown as coupler 70. FIG. 12B shows the left-hand side of coupler 82 with input port 14, and FIG. 12C shows its right-hand side with output ports 20a and 20b.

According to the foregoing design example, the sub-backward converters (or sub-converters), each of which may be substantially axisymmetrical, are unioned together and then intersected with the forward converter. Alternatively, each sub-converter can be first intersected with the forward converter, producing a non-axisymmetrical shape, before being unioned to the other sub-converters. Both approaches can result in the same shape, so that they are mathematical equivalents of each other.

Coupler 10 (FIGS. 1 and 5A–5H) constructed according to the preferred dimensions mentioned above achieves a light loss of only about 11%, which is the result of 8% Fresnel reflection losses at the input and output ports and 3% from losses at the "X". This loss can be minimized through the use of index matching or anti-reflection coatings. Analysis of coupler 50 (FIGS. 4 and 7A–7H) also indicates a reduced light loss of only about 8% from Fresnel reflections, where the 3% loss at the "X" is removed because the "X" is no longer perpendicular to the main axis of light propagation. The combined area of output ports for the various couplers described is preferably limited to no more than approximately twice the area of the input port, and preferably is less than the mathematical product of 0.95, the number of output ports, and the area of the input port (e.g., 1.9 times the area of the input ports for the case of two output ports). The maximum cross sectional dimension of the output ports along the described axis is preferably less than the maximum cross sectional dimension of the input port along the axis.

The couplers described herein may be formed, for instance, from a clear plastic material such as acrylic, by molding, casting, machining, or related fabrication methods. The surfaces should be smooth to avoid scattering light passing through the coupler by total internal reflection. The couplers preferably each comprise an integrated, single, preformed unit, into which light guides, etc., can be coupled or integrated if desired. In some cases, it may be desirable to make the input to breakpoint portion of the coupler from one piece of material, and make the breakpoint to output portions separately. In the vicinity of each light port, a short cylindrical section can be added to facilitate coupling to light guides, etc. The couplers are preferably axially surrounded by a protective cover (not shown) having a lower index of refraction than the coupler.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. An optical coupler for coupling light along an axis between a light port on one side of the coupler and a plurality of light ports on another side of the coupler, comprising:
   a) a one-side stage with a light port; the one-side stage not being segmented along the axis;
   b) a many-side stage with a plurality of arms situated about said axis, each having a light port;
   c) a midput region(separating said one-side and many-side stages and being situated along said axis where said plurality of arms at least initially starts to split from each other in a direction towards said many-side light ports along said axis;
   d) cross sections of each of the respective initial portions of said arms along said direction being arranged about the same distance from said axis;
   e) the cross sectional areas of said arms along said axis being larger at a break point region at which said arms fully separate from each other along said axis than at said many-side light ports; and
   f) at least a pair of said arms each starting to split along said direction in a substantially symmetrical manner about said axis.

2. An optical coupler for coupling light along an axis between a light port on one side of the coupler and a plurality of light ports on another side of the coupler, comprising:
   a) a one-side stage with a light port; the one-side stage not being segmented along the axis;
   b) a many-side stage with more than two arms situated about said axis, each having a light port with a non-polygonal cross section along said axis;
   c) a midput region(separating said one-side and many-side stages and being situated along said axis where said plurality of arms at least initially starts to split from each other in a direction towards said many-side light ports along said axis; a break point region being defined along said axis where said arms fully separate from each other;
   d) cross sections of each of the respective initial portions of said arms along said direction being arranged about the same distance from said axis;
   e) at least a pair of said arms each starting to split along said direction in a substantially symmetrical manner about said axis; and
   f) the cross sectional areas of said arms substantially changing shape between said break point region and said many-side light ports.

3. An optical coupler for coupling light along an axis between a light port on one side of the coupler and a plurality of light ports on another side of the coupler, comprising:
   a) a one-side stage with a light port; the one-side stage not being segmented along the axis;
   b) a many-side stage with more than two arms situated about said axis, each having a light port with a non-polygonal cross section along said axis;
   c) a midput region(separating said one-side and many-side stages and being situated along said axis where said plurality of arms at least initially starts to split from each other in a direction towards said many-side light ports along said axis; a break point region being defined along said axis where said arms fully separate from each other;
   d) cross sections of each of the respective initial portions of said arms along said direction being arranged about the same distance from said axis;
   e) at least a pair of said arms each starting to split along said direction in a substantially symmetrical manner about said axis; and
   f) cross sectional areas of said output arms along said axis being substantially larger at said break point region than at said many-side ports.

4. The optical coupler of claim 1 or 3, wherein the cross sectional areas of said arms substantially change shape between said break point region and said many-side light ports.

5. The optical coupler of claim 1, 2 or 3, wherein said many-side stage is configured to cause a substantially higher angular distribution of light at said many-stage light ports than at said break point region.

6. An optical coupler for coupling light along an axis between a light port on one side of the coupler and a plurality of light ports on another side of the coupler, comprising:
   a) a one-side stage with a light port positioned at a first point along said axis; the one-side stage not being segmented along the axis;

b) a many-side stage with a plurality of arms situated about said axis, each having a light port, with at least two of said arms which are generally parallel to said axis having their associated light ports positioned at a second point along said axis;

c) a midput region(separating said one-side and many-side stages and being situated along said axis where said plurality of arms at least initially starts to split from each other in a direction towards said many-side light ports along said axis; cross sections of each of the respective, initial portions of said arms along said direction being arranged about the same distance from said axis;

d) a break point region being defined along said axis where said arms fully separate from each;

e) said coupler having a substantially final configuration including an angle-to-area converter shape along said axis and defined by the conceptual steps of:

i) designing a conceptual, single angle-to-area converter for placement between said first and second points along said axis; the axial end of said converter at said first point defining said one-side light port;

ii) designing a plurality of conceptual angle-to-area sub-converters for positioning between said first and second points along said axis; the axial ends of each of said sub-converters at said second point defining said many-side light ports; adjacent sub-converters being positioned at said first point in a manner for defining a first area at least covering said one-side light port of said single converter;

iii) unioning the overlapped sub-converters together;

iv) said single converter being designed with an end at said second point that surrounds all of said many-side light ports; and v) interpositioning the converter and the unioned sub-converters along said axis, each between said first and second points, and intersecting them to form a substantially final configuration of said coupler.

7. The optical coupler of claim 6, wherein said step e) ii) includes the step of positioning said sub-converters with overlapping regions at said first point for defining said first area.

8. The optical coupler of claim 2 or 6, wherein cross sectional areas of said output arms along said axis are substantially larger at said break point region than at said many-side ports.

9. The optical coupler of claim 6, wherein said many-side stage starts to split along said direction in a substantially symmetrical manner about said axis.

10. The optical coupler of claim 9, wherein said many-side stage continues to split along said direction in a substantially symmetrical manner about said axis at least up to the location of said break point region.

11. The optical coupler of claim 1, 2, 3 or 10, wherein:

a) said break point region is spaced from said midput; and b) said many-side stage starts to split along said direction by including a central void whose cross sectional area increases along said axis in a smooth manner between said midput region and said break point region.

12. The optical coupler of claim 11, wherein the periphery of the cross section of said central void about said axis defines arc segments corresponding in shape to the inner peripheries of the shapes of said arms about said axis on the side of said break point region closer to said many-side light ports.

13. The optical coupler of claim 11, wherein said splitting between said arms additionally occurs by including smooth, peripheral voids in said output stage elongated along said direction, facing outwardly with respect to said axis and smoothly integrated with a separating void between said arms on the side of said break point region closer to said many-side light ports.

14. The optical coupler of claim 1, 2, 3 or 6, wherein at least a pair of said many-side light ports are spatially separated from each other to accommodate cladding on adjacent ends of a plurality of light guides.

15. The optical coupler of claim 1, 2, 3 or 6, wherein at least a pair of said many-side light ports are spatially separated from each other by at least about 2 mm.

16. The optical coupler of claim 1, 2, 3 or 6, wherein outer peripheries of at least a pair of said arms, along said axis, are substantially parallel to each other.

17. The optical coupler of claim 1, 2, 3 or 6, wherein said arms separate from each other in an "X" pattern as viewed along said axis, the center of said pattern being situated substantially more towards said many-side light ports than the peripheries of said pattern.

18. The optical coupler of claim 1, 2, 3 or 6, wherein said many-side stage is rotationally symmetric about said axis.

19. The optical coupler of claim 1, 2, 3 or 6, wherein the cross section of said midput region along said axis is round.

20. The optical coupler of claim 1, 2, 3 or 6, wherein said coupler is formed in a way to utilize total internal reflection as the primary light propagation means.

21. The optical coupler of claim 1, 2, 3 or 6, wherein said coupler is formed in a way to utilize refraction imaging as the primary light propagation means.

22. The optical coupler of claim 1, 2, 3 or 6, wherein the maximum cross sectional dimension of said many-side light ports along said axis is less than the maximum cross sectional dimension of said one-side light port along said axis.

23. The optical coupler of claim 1, 2, 3 or 6, wherein the length of one of said arms is selected to cause angular distribution of light at its associated light port to be substantially no greater than the angular distribution of light at said one-side stage light port.

24. The optical coupler of claim 1, 2, 3 or 6, wherein the combined area of said many-side light ports is less than the mathematical product of 0.95, the number of said many-side light ports, and the area of said one-side light port.

25. The optical coupler of claim 1, 2, 3 or 6, wherein said coupler comprises a preformed, integral piece of optical material.

26. The optical coupler of claim 1, 2, 3 or 6, wherein said coupler is arranged to receive light in said light ports in said many-side stage and to transmit such light to said light port in said one-side stage.

27. The optical coupler of claim 1, 2, 3 or 6, wherein said one-side light port and said many-side light ports have different cross-sectional shapes along said axis.

* * * * *